UNITED STATES PATENT OFFICE.

OSCAR H. MACK AND WINFIELD S. FERGUSON, OF SEATTLE, WASHINGTON.

COMPOSITION FISH-BAIT.

1,045,716. Specification of Letters Patent. Patented Nov. 26, 1912.

No Drawing. Application filed April 19, 1912. Serial No. 691,939.

*To all whom it may concern:*

Be it known that we, OSCAR H. MACK and WINFIELD S. FERGUSON, citizens of the United States, residing at Seattle, in the county of King and State of Washington, have invented certain new and useful Improvements in Composition Fish-Bait; and we do hereby declare the following to be a full, clear, and exact description of the invention, such as will enable others skilled in the art to which it appertains to make and use the same.

This invention relates to fish bait and has for an object to provide a composition analogizing fish spawn which when employed as bait takes the place of such spawn which is recognized as being highly efficacious as bait for certain kinds of fish.

In carrying into effect the present invention we take tapioca in the form of kernels 16 ounces, white cane sugar 8 ounces, water 48 ounces and coloring matter to produce a coloring of the granules analogizing the spawn to be imitated. For imitating salmon spawn we employ ¼ ounce of a commercial coloring matter known upon the market as "Violac", the composition of which is not known but which produces a blood-red coloring of the granules.

The ingredients above mentioned are mixed together and permitted to soak for eighteen hours, after which the excess water is drained off and the soaked tapioca kernels placed in cans or bottles which are later to be sealed. The composition still contained in the bottles or cans is now baked in a medium heat for thirty minutes sufficient to dry out the water and leave each of the colored kernels separate. To the thus separated kernels 6 ounces of water is added at boiling heat and the cans or bottles hermetically sealed. The 6 ounces of water last added will be sufficient to cover the loose separated kernels but will soon after sealing become absorbed by the kernels which will remain of soft, wet, cohering consistency and when placed on a fish hook will hold their form and color, and make an excellent bait for catching fish, particularly trout.

We claim:

1. The herein described process of producing fish bait consisting in soaking tapioca kernels in sweetened water, submitting the soaked tapioca to a baking process to dry out the water, adding additional water and hermetically sealing.

2. The herein described process of producing fish bait consisting in soaking tapioca kernels in sweetened water until such kernels are soft, pouring off the excess water, submitting to a baking heat sufficient to dry out the water, adding additional water to cover and hermetically sealing.

3. The herein described process of producing fish bait consisting in soaking tapioca kernels in sweetened water, adding a coloring matter to imitate the color of fish spawn, permitting the mixture to soak until the kernels are thoroughly softened, evaporating the water and adding additional water at boiling heat sufficient to be absorbed by the kernels.

4. The herein described process of producing fish bait consisting in soaking tapioca kernels in water containing white cane sugar until the kernels are thoroughly softened, draining off the excess water, cooking the softened kernels and adding sufficient boiling water to cover the cooked kernels to be absorbed by such cooked kernels.

5. A fish bait comprising tapioca kernels softened, sweetened and colored to the coloring imitating fish spawn, each kernel being a separately removable globule.

In testimony whereof we affix our signatures in presence of two witnesses.

OSCAR H. MACK.
WINFIELD S. FERGUSON.

Witnesses:
G. WARD KEMP,
C. C. PHILLIPS.